United States Patent [19]
Freeman

[11] Patent Number: 5,652,679
[45] Date of Patent: Jul. 29, 1997

[54] OPTICAL SYSTEMS, TELESCOPES AND BINOCULARS

[75] Inventor: Michael Harold Freeman, Denbigh, Wales

[73] Assignee: Optics and Vision Limited, Wales, United Kingdom

[21] Appl. No.: 30,088
[22] PCT Filed: Sep. 25, 1991
[86] PCT No.: PCT/GB91/01648
§ 371 Date: Mar. 26, 1993
§ 102(e) Date: Mar. 26, 1993
[87] PCT Pub. No.: WO92/05462
PCT Pub. Date: Apr. 2, 1992

[30] Foreign Application Priority Data
Sep. 26, 1990 [GB] United Kingdom ............ 9020902

[51] Int. Cl.⁶ .................. G02B 17/00; G02B 21/00; G02B 23/00
[52] U.S. Cl. .............. 359/731; 359/364; 359/366; 359/407; 359/728; 359/729
[58] Field of Search ..................... 359/362–367, 359/399–409, 726–731, 857–861, 423, 432; 356/247, 251

[56] References Cited

U.S. PATENT DOCUMENTS

| | | | |
|---|---|---|---|
| 3,897,133 | 7/1975 | Warner et al. | 359/399 |
| 3,985,421 | 10/1976 | Beecher | 359/407 |
| 4,221,459 | 9/1980 | Fisher | 359/399 |
| 4,488,790 | 12/1984 | Beecher | 359/407 |
| 4,497,540 | 2/1985 | Breckinridge et al. | 359/858 |
| 4,598,981 | 7/1986 | Hallam et al. | 359/366 |
| 4,758,077 | 7/1988 | Beecher | 359/407 |
| 4,779,969 | 10/1988 | Sato et al. | 359/432 |
| 4,804,258 | 2/1989 | Kebo | 359/366 |
| 4,877,318 | 10/1989 | Miles et al. | 359/431 |
| 4,940,324 | 7/1990 | Nichols | 356/251 |

FOREIGN PATENT DOCUMENTS 2918 of 1806 United Kingdom ............ 359/423

OTHER PUBLICATIONS

SPIE, vol. 237, 1980 International Lens Design Conference Proceedings; D. de Jager: "Camera Viewfinder Using Tilted Concave Mirror Erecting Elements", pp. 292–298, See the Whole Article (cited in the Application).

*Primary Examiner*—Thong Nguyen
*Attorney, Agent, or Firm*—Locke Reynolds

[57] ABSTRACT

An optical system including at least one lens and erecting mirrors designed and arranged to give an inherent aperture and field greater in one direction than another direction. By using a low power eyepiece lens it is possible to arrange for a user's eye or eyes to be further behind the eyepiece lens so that the user can wear normal spectacles to correct for eye defects. When a pair of the optical systems is used in a pair of binoculars, it is possible for the exit pupils to be in a form of horizontal slots so the systems do not have to have adjustable spacing to allow for a particular user's eye separation.

27 Claims, 7 Drawing Sheets

OPTICAL SYSTEMS, TELESCOPES AND BINOCULARS

FIELD OF THE INVENTION

The present invention relates to optical systems for viewing devices such as binoculars and telescopes.

BACKGROUND OF THE INVENTION

Optical systems used in binoculars have optical paths folded by means of reflective prisms and are arranged to give erect images. The substitution of prisms by mirrors has been analysed in a paper "Camera viewfinder using tilted concave mirror erecting elements" by Donald DeJager in the SPIE Vol 237 at page 292 of 1980 but the arrangement was found unsatisfactory due to excessive amounts of astigmatism, variation of focus across the field, distortion and coma. Arrangements using erecting mirrors are also described in U.S. Pat. Nos. 4,598,981, 4,804,258, 4,758,077, 4,221,459 and 3,897,133. The first two do not incorporate any lenses and solely use mirrors which do not have an erecting function. The last three have circular fields and apertures with the last one having an annular aperture and it is known that annular apertures give poor visual images.

SUMMARY OF THE INVENTION

The present invention in one of its aspects aims at providing an approach whereby an optical system can use mirrors while giving acceptable performance with compact shape.

One aspect of the present invention provides an optical system for telescopes and binoculars having an optical path folded by erecting mirrors and comprising at least one lens characterized in that the system has an inherent aperture and field greater in a direction transverse to a direction in which the path is folded.

Normally the optical systems would have an objective lens unit and an eyepiece lens means with an additional aspect of the present invention providing an optical system for telescopes and binoculars comprising an objective lens unit and an eyepiece lens unit with an optical path therebetween folded by erecting mirrors characterized in that the system has an aperture and field greater in a direction transverse to a direction in which the path is folded.

In use the greater field and aperture will be horizontal and the smaller field vertical. This will be acceptable for most uses such as scanning the horizon and permits a very advantageous binocular design to be designed with the optical paths folded tightly on themselves possibly in the shape of a Z or with the optical path folded so as to cross itself.

In the optical system the smaller field and aperture may be offset so that the optical system may otherwise be centered about a single axis as is the case in most optical systems where all the surfaces have their centers of curvature lying on a single axis.

The invention is not limited to the mirrors, objective lens unit and eyepiece lens means having spherical surfaces, but these can also be aspheric such as parabolic or toroidal. In this event such surfaces do not have a single point center of curvature and when used with off-axis apertures will tend to have centers of curvature blurred over a volume in space centered about two locations and with the volume increasing with increased aperture. The Gauss center of curvature or the center of curvature of the best-fit sphere can be taken as a representative value and will herein be termed the center of curvature. This center of curvature will also be used to define a mean radius of curvature.

It is convenient to define the positions of some of the centers of curvature in relation to a viewing axis which is the line joining the center of the viewed object to the center of the user's eye through the system when the system is being used.

It has been said that the folded path can be in the nature of a Z. The angles contained in the Z are preferably no greater than 30° and this can be achieved by offsetting the used areas of the objective lens unit, mirrors and eyepiece lens means from the viewing axis possibly assisted by having the centers of curvature of the mirrors at distances not more than 20% but preferably less than 10% of their radii of curvature from the viewing axis and the centers of curvature of the objective lens unit and eyepiece lens means displaced by up to about twice the greater of said distances. The Z can be slightly skew, that is with the bottom bar of the Z not parallel with the top bar, so that the spacing of the objective lens units in a pair of binoculars can differ from the spacing of the eyepiece means. If the folded path is not Z shape, the optical path could still be as tightly folded and skewed.

In its basic form if the system were generally horizontal, the field seen by the objective lens unit would be below the horizon and the final image viewed by the user's eye after magnification would appear to be even further below the horizon by the amount of the magnification. This in some instances may be an advantage but at least the displacement of the image can be corrected by further optical elements and/or the discrepancy of the direction of the system and the horizon can be corrected by design of a housing.

The mirrors need not be simple mirrors but could for example be more complex. For example, at least one mirror could be a so-called Mangin mirror comprising a lens with a reflective rear surface which would of course alter the effective center of curvature.

The optical systems according to the present invention lend themselves to combination in pairs to form binoculars with the systems generally parallel and with the smaller field and aperture in each case vertical, that is at right angles to the plane through the two systems forming a pair of binoculars.

Another aspect of the present invention concerns a pair of binoculars having exit pupils in the form of horizontal slots.

If these slots are long enough, say up to twenty but typically eight or nine millimeters, they will form linear eye rings so that there will generally be no need to adjust the separation of the two systems as in conventional binoculars to match the separation of the user's eyes.

BRIEF DESCRIPTION OF THE DRAWINGS

The invention will now be described by way of example with reference to the accompanying drawings.

DESCRIPTION OF EXEMPLARY EMBODIMENTS

Figure 1:
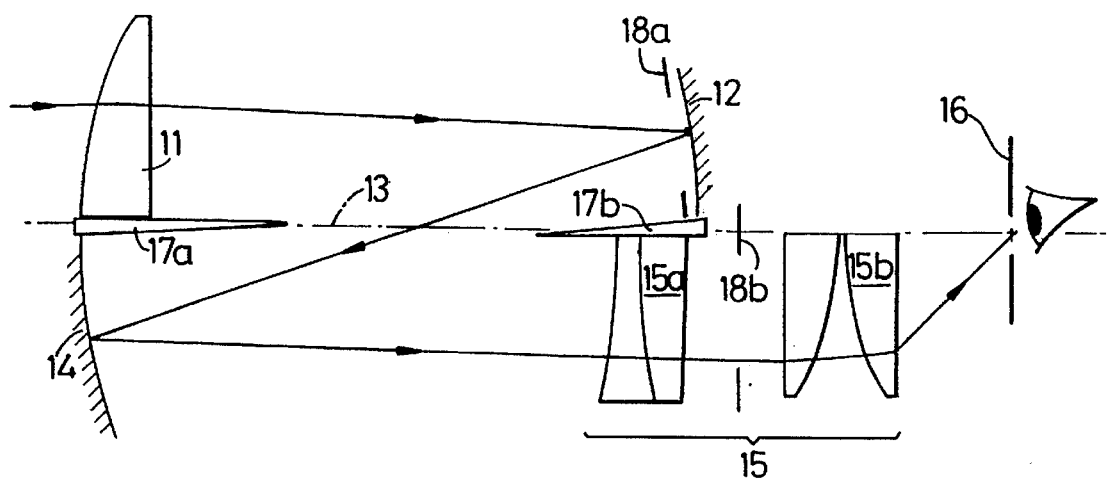
FIG. 1 is a schematic axial section of an optical system according to the present invention.
Figure 1A:
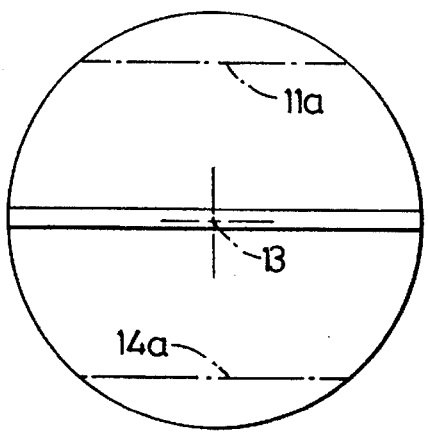
FIG. 1A illustrates the shapes of mirrors, objective lens unit and eyepiece lens means used in FIG. 1.
Figure 2:
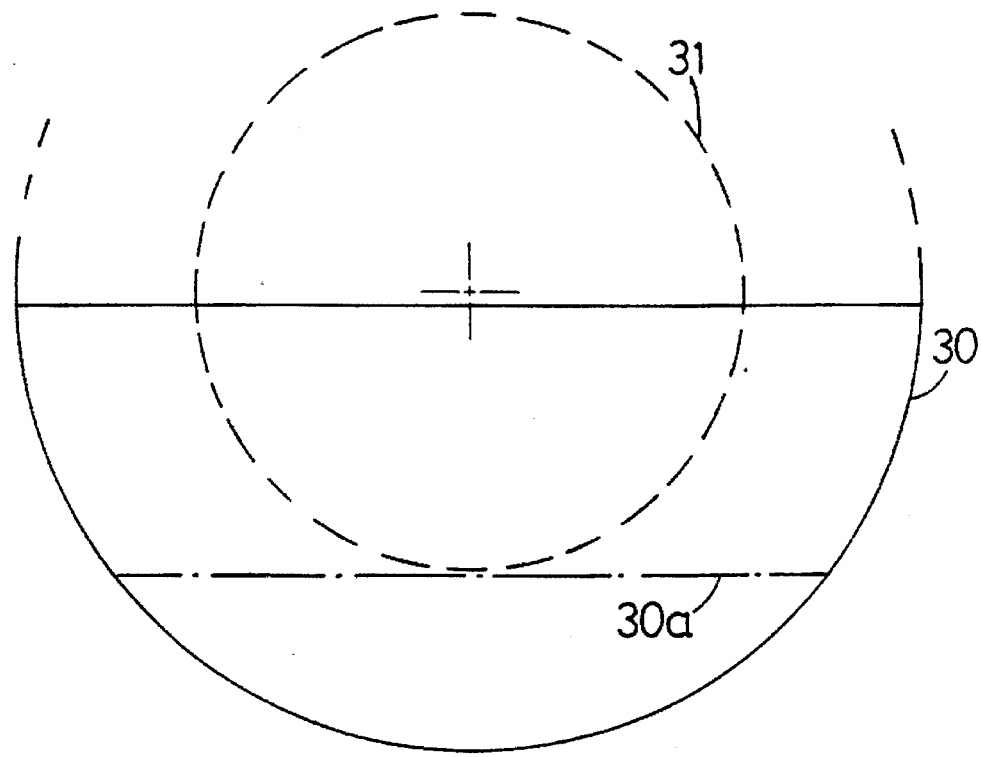
FIG. 2 illustrates the field of view given by the present invention.

FIG. 1 illustrates the basic concept of an optical system according to the present invention. Light from an object, which may be infinitely distant so that the light is in the form of substantially parallel bundles of light rays, enters the optical system through an objective lens unit 11 which may be a single lens and after a distance from that unit impinges on a first erecting mirror 12. The unit has a focal length such that it forms an image reasonably close to the mirror so as to minimize pupil aberrations due to the mirror. The mirror has an effective radius of curvature half to twice the said distance. The path of the light is folded into a Z-shape with the included angles up to 30°. The light after reflection by the mirror 12 is directed onto a similar second erecting mirror 14 which redirects the light to be largely parallel to the original direction and forms an image to be viewed by an eyepiece lens means 15. This means directs the light substantially collimated through an exit pupil 16. The image to be viewed by the eyepiece lens means will be in many cases straddled by components 15a and 15b of the eyepiece lens means, which conveniently is below the mirror 12, in the manner of a Huygens-type eyepiece. One or each of the mirrors can be a simple concave element or a planar or even convex mirror combined with lenses in the manner of a Mangin mirror which largely performs as a concave mirror. To ensure that only the desired light reaches the eye, baffles 17a and 17b of opaque material can be provided, as can field stops 18a and 18b, in any advantageous positions. In this embodiment the centers of curvature of the mirrors' and the unit and means' surfaces can all lie on the same axis 13. A view on the objective lens unit and the back face of the mirror 14 or on the back face of mirror 12 and the eyepiece lens means would be as shown in FIG. 1a with the various items being semicircular or truncated as shown by chain-dot lines 11a and 14a. In FIG. 2, the field of view of the system is as shown in full lines 30 (for comparison the circular field obtained with conventional binoculars is shown in broken lines 31). It will be seen that the field with the present system is reduced from a wider overall field so as to leave a wider field of view in one direction (usually horizontal) and a narrower field of view in a direction transverse to said one direction. Chain dot line 30a shows the field when the unit mirrors and means are as shown with reference to lines 11a and 14a. The wider field of view is in a direction transverse to a direction in which the optical path is folded. There are two such directions of fold in some arrangements, a direction which is generally in the vertical plane containing the viewing axis and another direction slightly skew to that direction to allow for different spacings of the objective lens units and the user's eyes but such directions are substantially the same. The field of view with the present system is not centered with the wide overall field nor with the conventional field but this may not be significant.

Figure 3:
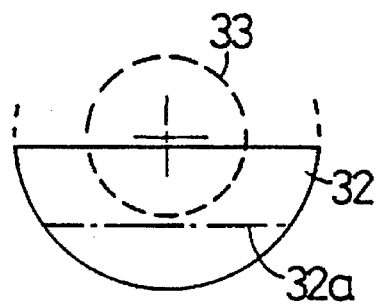
FIG. 3 illustrates a linear exit pupil that can be provided according to the present invention.

FIG. 3 shows the exit pupil 32 available with the present invention compared with the exit pupil 33 of conventional optical systems (chain-dot line 32a corresponds to lines 11a and 14a). This exit pupil is in the form of a slot up to 20 mm long but typically 8 to 9 mm. This yields advantages when a pair of optical systems are combined into binoculars when the exit pupils can be in line and there would be no need to allow for adjustable separation of the optical systems to accommodate different eye spacing of various users. The wide field of view and the wide exit pupil being in the same orientation does not lead to excessive coma since a user's eye will not accept light from the entire pupil but only from part of it. Any coma and the resulting anamorphic distortion due to using a non-central viewing position can be minimized by optical design.

Figure 4:
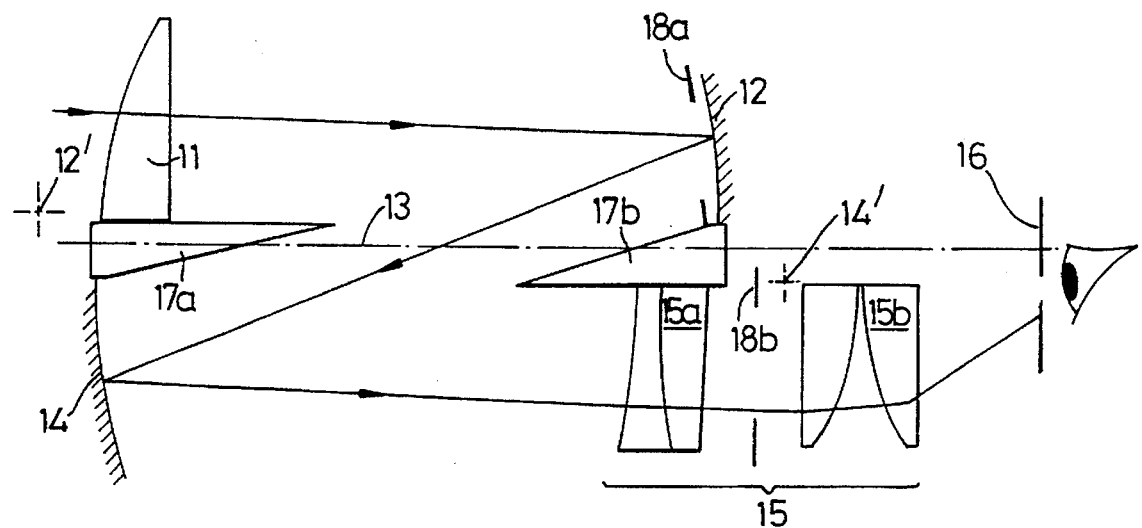
FIG. 4 illustrates a modification to the system shown in FIG. 1.
Figure 4A:
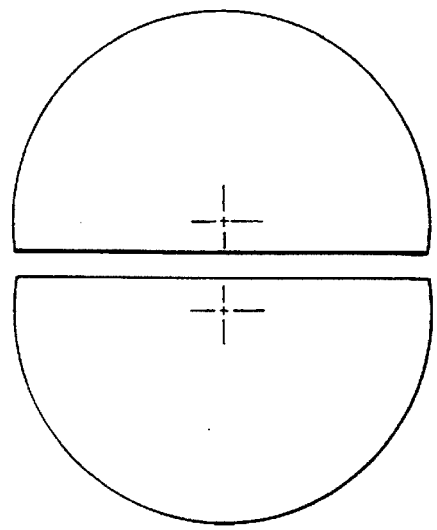
FIG. 4A shows the shape of mirrors, objective lens unit and eyepiece lens means that can be used in FIG. 4.

FIG. 4 illustrates the effect of making the angle of fold less tight so the optical axes of the objective lens unit 11 and the eyepiece lens means are not in the same horizontal plane but in spaced apart planes. This permits better baffles 17a and 17b and the mirrors, objective lens unit and eyepiece lens means to be more than semicircular as shown in FIG. 4a. The center 12' of curvature of mirror 12 would in this event be displaced by not more than 20% but preferably less than 10% of the radius of curvature from the viewing axis and the center 14' of curvature of mirror 14 similarly displaced. Thus FIG. 4 represents a decentered system wherein the optical system does not have a single axis and FIG. 4a shows the appearance of this in the same manner as FIG. 1a. The systems as illustrated select from the overall view an object field from the lower part of that overall view (i.e. the system looks slightly down) so that the inverted image projected in the vicinity of the first mirror is wholly or mainly above the optical axis of the objective lens unit. This enables a vertically compact design which does not require fold angles greater than 30°.

Figure 5:
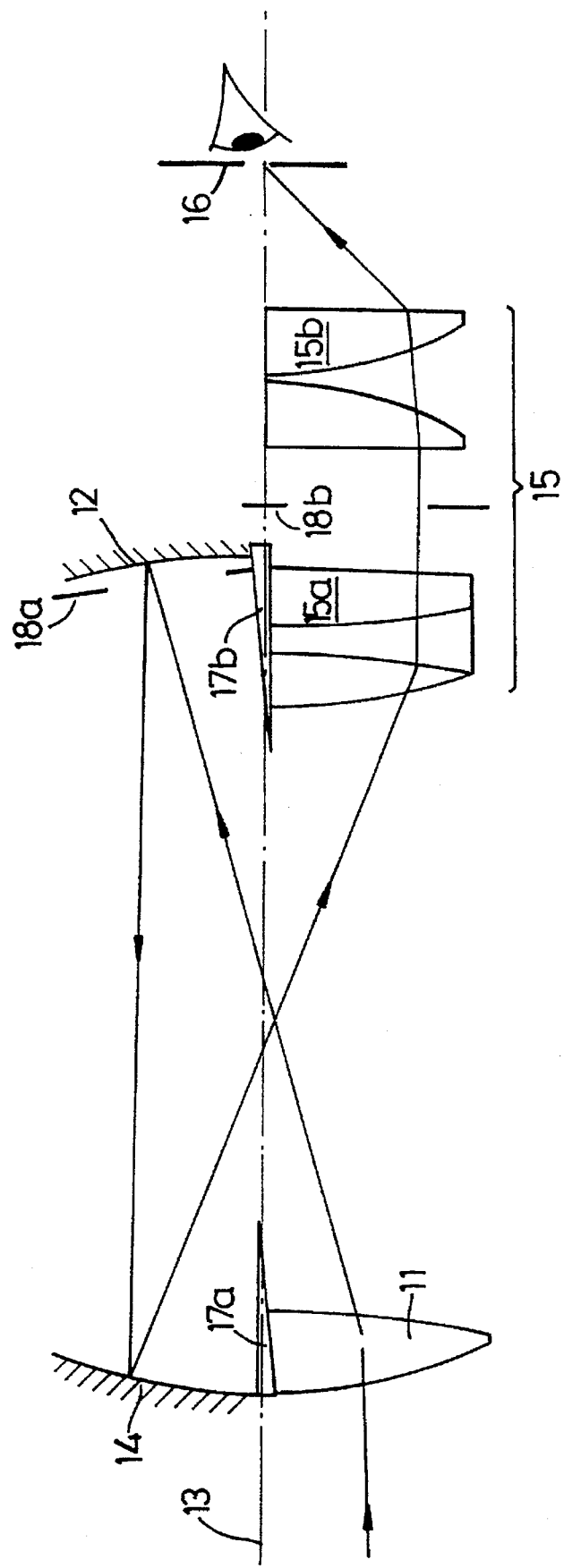
FIG. 5 illustrates a different arrangement of an optical system.

FIG. 5 shows a different optical geometry. The objective lens unit 11 is below the viewing axis and the light path crosses itself.

Figure 6:
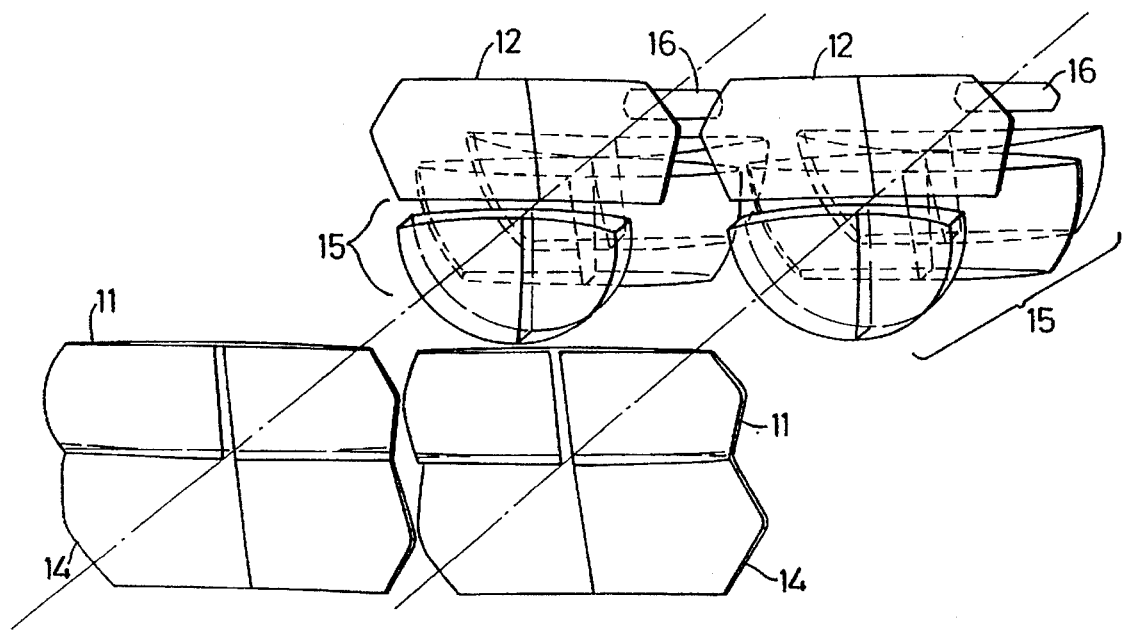
FIG. 6 is a perspective view of a pair of systems according to FIG. 1 or FIG. 4 arranged as a pair of binoculars.

Optical systems according to the present invention lend themselves to combinations in pairs to form binoculars with the two systems parallel and with the larger field horizontal as shown in perspective in FIG. 6.

Figure 7:
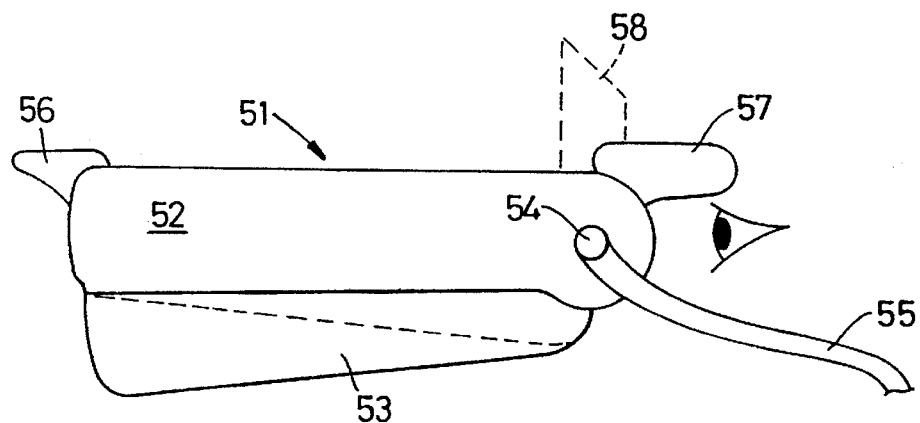
FIG. 7 is a side view of a housing for a pair of binoculars.

FIG. 7 shows a suitable housing 51 for the two systems of a pair of binoculars. This housing is formed as a flattish box with an upper member 52 pivoted to a lower member 53 by a hinge 54 so that the two members can be pushed together when the binoculars are not in use and then freed by a suitable catch (not shown) so that a spring (not shown) can push the members ajar for use into the illustrated condition. The upper member carries the objective lens units and the mirrors 12 with the lower member carrying the mirrors 14 and the eyepiece lens means, the mechanical arrangement should be such that the various components would not interfere with the two members being pushed together, thus for example in FIG. 1 the objective lens unit 11, the baffle 17a and the mirror 14 could not be as shown but the unit 11 must be further to the left or right as shown in the drawings. The hinge 54 can be used as a mounting or attachment point for a carrying strap 55. The upper member has a forward extension or extensions 56 acting as a lens hood and a rearward extension or extensions 57 acting as a brow rest or rests to space the binoculars from the wearer's eyes. Miniature periscopes 58 may be provided above each of the user's eyes in or near the brow rest or rests to allow the user to see a direct view of the object as well as the magnified view which is seen below the direct view. The top of the housing can be sloped at least in part so that the top surface can be aligned with the distant object or the apparent object can be moved by means of a prism but such provision may not be necessary and aiming can be done by the periscopes. (The feel of the binoculars may not matter.)

Figure 8:
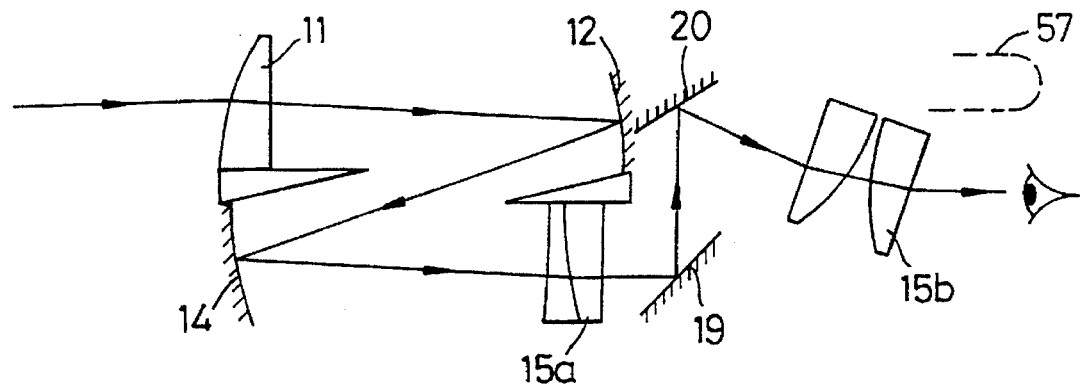
FIG. 8 is a schematic axial section of another optical system.

It has been said that the field as shown in FIG. 2 is centered below the center seen with conventional binoculars. This can be corrected as shown in FIG. 8 by using a pair of plane mirrors 19 and 20 arranged generally as a periscope as shown within the eyepiece lens means so as to allow the component 15b of the eyepiece lens means to be tilted. The spacing between the components 15a and 15b of the eyepiece lens means can be increased to accommodate these mirrors and the longer optical path produced if the mirror 14 projects an image further to the right.

Figure 9:
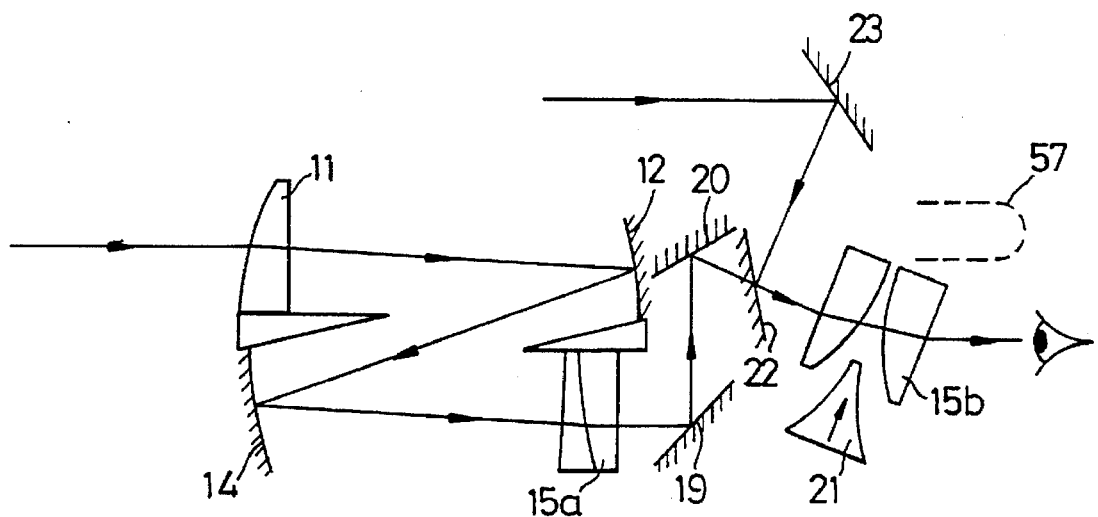
FIG. 9 illustrates a further optical system.

FIG. 9 shows a modification of FIG. 8 in which the direct view or periscope facility mentioned in relation to FIG. 7 is provided within the eyepiece lens means by inserting a compensating lens 21 between lenses 15b and either rotating the mirror 20 or inserting a new mirror 22. The mirror 20 or mirror 22 would direct the optical path up to a permanent mirror 23 so forming a periscope. The component 15b with the lens 21 in place would have negligible optical effect so the direct view would not be magnified but the system would be readily switched to a magnified view by a mechanism (not shown) for inserting the lens 21 and either rotating mirror 20 or inserting mirror 22.

Figure 10:
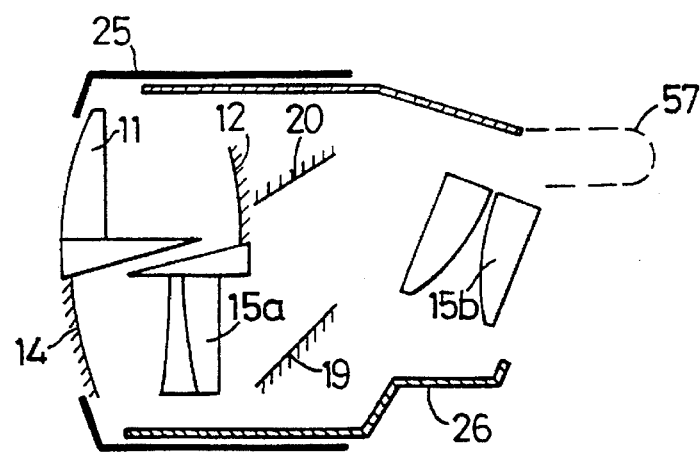
FIG. 10 illustrates a telescopic housing for the system of FIG. 8.

FIG. 10 shows an alternative to the housing shown in FIG. 7 in which two housing parts 25 and 26 can be extended telescopically from a shorter (as shown) non-use condition to a longer in-use condition.

In relation to FIG. 7 mention has been made of a brow rest. The design of the optical system according to the present invention wherein the use of erecting mirrors which tend to introduce negative field curvature offsetting the positive field curvature normally present enables the power of optical surfaces in the eyepiece lens means to be reduced and for the user's eye to be further behind the eyepiece lens means. This enables the user to use his own spectacles which will correct for the user's optical faults such as long-sightedness, short-sightedness and astigmatism freeing the optical system according to the present invention from the need to be adjustable to cope with these. The main requirement is then to focus for near and distant objects and this could be done by arranging mirrors 12 and 14, eyepiece lens means and/or objective lens unit, or the mirrors 19 and 20, to be displaceable a small distance (less than 3 or 4 millimeters possibly) by a spring loaded action or actions. In binoculars the focusing action can be achieved by having both systems adjustable as one although separate focusing is possible.

The optical systems can be fitted in the housing as illustrated in FIGS. 1 to 5 or upside down.

The optical performance can be optimized by the complexity and quality of the mirrors, objective lens unit and eyepiece lens means. In general spherical aberration and longitudinal color will be controlled at the objective lens unit and the mirror 14, lateral color and astigmatism within the eyepiece lens means, curvature of the field largely by balancing the effects of the mirror reflections and refractions in the unit and the means, and coma by arranging that the light deviates less at larger apertures and more at smaller apertures. The mirrors, unit and means can have more components than shown and may use complex forms such as doublet or triplet lenses.

In each system the limited vertical field is obtained by the shapes of the mirror, objective lens unit, eyepiece lens means and/or the stops. Instead of stops, field lenses could be used.

Figure 11:
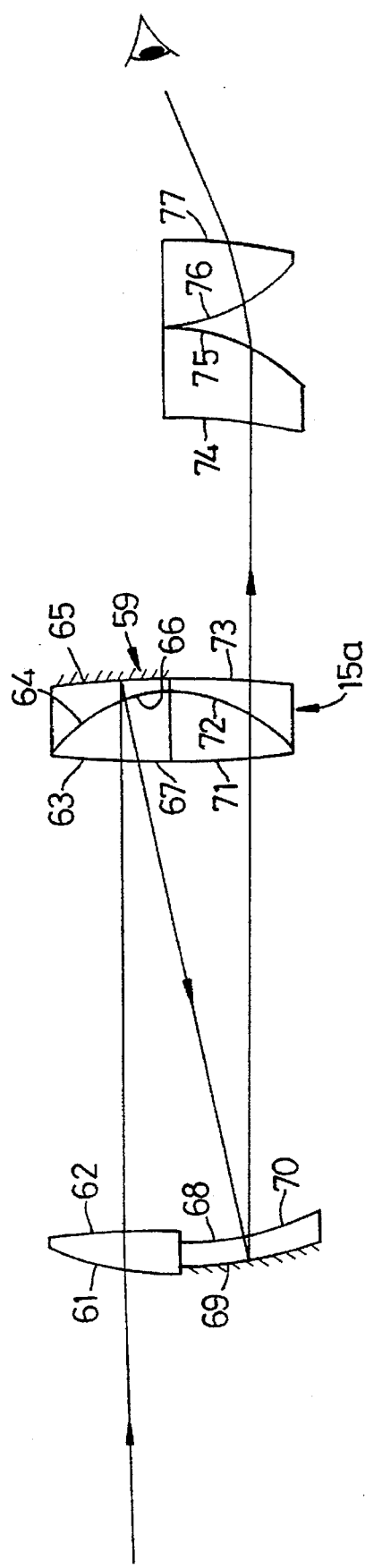
FIG. 11 is a view similar to FIG. 1 for a low power optical system using a Mangin mirror as the first inverting mirror to identify surfaces referred to in tables given below.
Figure 12:
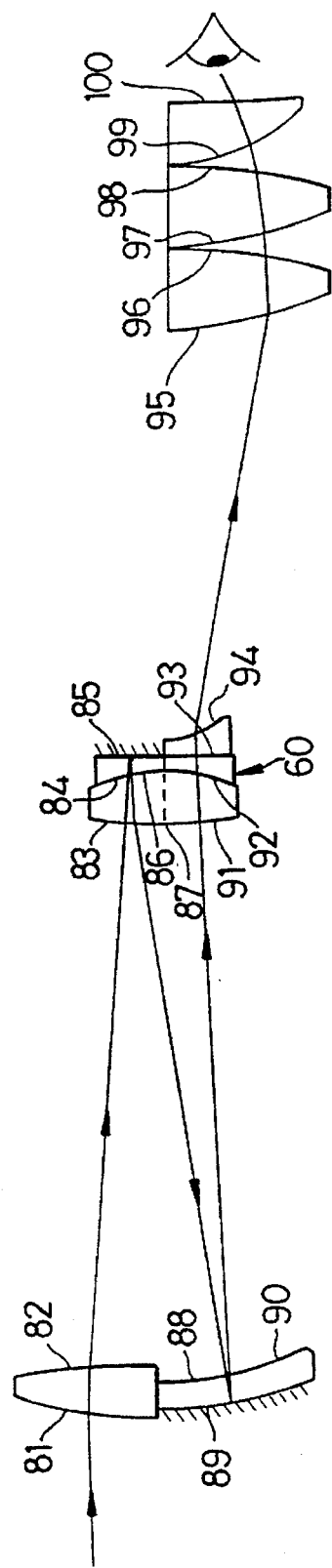
FIG. 12 is a view similar to FIG. 11 but having a high power magnification system.

FIGS. 11 and 12 are views similar to FIG. 1 giving respectively a low and a high power system except that in FIG. 11 the mirror 12 is a Mangin mirror with the lens part of the mirror being that part of the eyepiece lens component 15a (which is cut away in FIG. 1) above the viewing axis and which part is silvered at 59 to form the mirror and in FIG. 12 the mirror 12 is similarly formed but on an auxiliary lens 60 disposed between the mirror and the eyepiece means. These figures are referenced to give the various surfaces referred to in the accompanying tables given below.

TABLE 1

4X magnification version

| Surface Number | Radius of Curvature (mm) | Axial Separation (mm) | Refractive Index | V-value (constringence) |
| --- | --- | --- | --- | --- |
| 61 | 77.691(A) | | | |
| | | 9.72 | 1.49176 | 57.45 |
| 62 | −573.515 | | | |
| | | 107.10 | AIR | |
| 63 | 248.631 | | | |
| | | 16.00 | 1.65713 | 49.55 |
| 64 | −36.314 | | | |
| | | 3.00 | 1.71300 | 53.83 |
| 65 | −236.263(B) | | | |
| | | (−)3.00 | 1.71300 | 53.83 |
| 66 | −36.314 | | | |
| | | (−)16.00 | 1.65713 | 49.55 |
| 67 | 248.631 | | | |
| | | (−)110.10 | AIR | |
| 68 | 74.719 | | | |
| | | (−)5.00 | 1.72825 | 28.41 |
| 69 | 105.464(B) | | | |
| | | 5.00 | 1.72825 | 28.41 |
| 70 | 74.719 | | | |
| | | 110.10 | AIR | |
| 71 | 248.631 | | | |
| | | 16.00 | 1.65713 | 49.55 |
| 72 | −36.314 | | | |
| | | 3.00 | 1.71300 | 53.83 |
| 73 | −236.263 | | | |
| | | 60.00 | AIR | |
| 74 | −129.938 | | | |
| | | 20.00 | 1.49176 | 57.45 |
| 75 | −44.461(A) | | | |
| | | 0.25 | AIR | |
| 76 | 30.359(A) | | | |
| | | 20.00 | 1.49176 | 57.45 |
| 77 | −141.178 | | | |

(A)Aspheric (conic) surfaces
Surface No 61 Asphericity −1.00229
Surface No 75 Asphericity −0.04036
Surface No 76 Asphericity −1.17224
(B)Reflecting surfaces This design provides a magnification of ×4 with a horizontal field of view up to 18°, equivalent to 72° in the image. The eye relief for the dimensions given in the table is about 25 mm and the eye 'ring' has a horizontal dimension up to 15 mm. The Z-fold angles are approximately 12°. Focusing may be obtained by movement of the central doublet.

TABLE 2

10X magnification version

| Surface Number | Radius of Curvature (mm) | Axial Separation (mm) | Refractive Index | V-value (constringence) |
|---|---|---|---|---|
| 81 | 105.820(A) | | | |
| | | 9.72 | 1.49176 | 57.45 |
| 82 | −219.202 | | | |
| | | 105.00 | AIR | |
| 83 | 107.666 | | | |
| | | 10.00 | 1.67269 | 32.21 |
| 84 | −39.190 | | | |
| | | 3.00 | 1.71300 | 53.83 |
| 85 | −471.032(B) | | | |
| | | (−)3.00 | 1.71300 | 53.83 |
| 86 | −39.190 | | | |
| | | (−)10.00 | 1.67269 | 32.21 |
| 87 | 107.666 | | | |
| | | (−)108.00 | AIR | |
| 88 | 73.975 | | | |
| | | (−)5.00 | 1.72824 | 28.41 |
| 89 | 99.256(B) | | | |
| | | 5.00 | 1.72824 | 28.41 |
| 90 | 73.975 | | | |
| | | 108.00 | AIR | |
| 91 | 107.666 | | | |
| | | 10.00 | 1.67269 | 32.21 |
| 92 | −39.190 | | | |
| | | 3.00 | 1.71300 | 53.83 |
| 93 | −471.032 | | | |
| | | 3.00 | 1.51680 | 64.17 |
| 94 | 20.627 | | | |
| | | 80.00 | AIR | |
| 95 | 56.398(A) | | | |
| | | 16.00 | 1.49176 | 57.45 |
| 96 | −117.855 | | | |
| | | 0.25 | AIR | |
| 97 | 56.398(A) | | | |
| | | 16.00 | 1.49176 | 57.45 |
| 98 | −117.855 | | | |
| | | 0.25 | AIR | |
| 99 | 37.638 | | | |
| | | 12.00 | 1.49176 | 57.45 |
| 100 | 350.631 | | | |

(A)Aspheric surfaces
Surface No 81   Conic −2.24327   A6 −2.022 × 10$^{-11}$
Surface No 95   Conic −6.24301
Surface No 97   Conic −6.24301
(B)Reflective surfaces This design provides a magnification of ×10 with a horizontal field of view up to 8°, equivalent to 80° in the image. The eye relief for the dimensions given is about 26 mm. The Z-fold angles are approximately 14° and 7°.

Embodiments of the invention can provide a high quality viewing instrument with greater ease and comfort of use.

In this specification and the appended claims an erecting mirror is one of a pair of mirrors, the second of which projects an image which is inverted with respect to the image received by the pair of mirrors. Normally each of the mirrors would have optical power effectively in the same manner as a concave mirror.

While in the above description, the full available horizontal and vertical apertures and fields with be used, it would be possible to cut these down from the inherent apertures and fields available to give circular or other apertures and fields.

I claim:

1. An optical system constructed about a viewing axis and comprising:
   an objective lens for receiving input light propagating in a predetermined direction;
   a first mirror for reflecting the input light to generate reflected light;
   a second mirror for reflecting the reflected light to generate twice reflected light, the twice reflected light propagating in a direction roughly parallel to the predetermined direction; and
   a eyepiece lens for receiving the twice reflected light and for focusing the twice reflected light;
   wherein the objective lens, first and second mirrors and eyepiece lens are constructed to have defined centers of curvature, the centers of curvature of the first and second mirrors being displaced from said axis by distances less than 20% of their respective radii of curvature, and the centers of curvature of the objective lens and the eyepiece lens being displaced from said axis by distances less than twice the allowed displacement distances of the first and second mirrors so that the light passing through the system traverses said axis at least once between the objective lens and the eyepiece lens to provide an inherent aperture and field which is larger in a direction transverse to the predetermined direction.

2. The optical system according to claim 1, wherein the first and second mirrors reflect the light at angles less than 30°.

3. The optical system according to claim 1, wherein at least one of the first or second mirrors forms a Mangin mirror.

4. The optical system according to claim 1, wherein the objective lens has a focal length to form an image on the first mirror.

5. The optical system according to claim 1, wherein the eyepiece lens is a Huygens-type eyepiece lens.

6. The optical system according to claim 1, further comprising an elongated slot extending in a direction of the larger field and aperture as an exit pupil.

7. An optical system according to claim 1 wherein each of the first and second mirrors have an inner edge which lies roughly in a plane containing said axis.

8. An optical system according to claim 1 wherein at least one surface of at least one of said lenses and mirrors of the optical system is aspherical.

9. An optical system constructed about a viewing axis and comprising:
   an objective optical sub-system for receiving input light propagating in a first direction;
   first positive power reflective optical sub-system for reflecting for a first time the input light to generate reflected light;
   a second positive power reflective optical sub-system for further reflecting the reflected light to generate twice reflected light propagating in a second direction; and
   an eyepiece optical sub-system for receiving and substantially collimating the twice reflected light;
   wherein the input light, reflected light and twice reflected light travel along an optical path which is folded by the first and second positive reflective optical sub-systems so that the light passing through the system traverses said axis at least once and said second direction is at least approximately parallel to said first direction, and each of the objective optical sub-system, first and second reflecting sub-systems and eyepiece optical sub-system have defined effective centers of curvature, the effective centers of curvature of the first and second reflecting sub-systems being displaced from said axis by distances less than 20% of their respective effective radii of curvature, and the effective centers of curvature of the objective optical sub-system and the eyepiece optical sub-system being displaced from said axis by distances less than twice the permitted displacement distances of the first and second reflecting sub-systems.

10. An optical system according to claim 9 wherein at least one surface of at least one of said optical sub-systems is aspherical.

11. An optical system according to claim 9 wherein the light passing through the optical system traverses said viewing axis twice between the objective sub-system and the eyepiece sub-system.

12. An optical system according to claim 9 wherein said objective optical sub-system and said second positive power reflective optical sub-system are roughly situated in a common plane arranged substantially perpendicularly to said viewing axis.

13. An optical system according to claim 9 wherein at least one of said first and second positive power reflective optical sub-systems comprises a concave mirror.

14. An optical system according to claim 9 wherein at least one of said first and second positive power reflective optical sub-systems comprises a Mangin mirror.

15. An optical system according to claim 9 wherein each of the first and second positive power reflective optical sub-systems have an inner edge which lies roughly in a plane containing said axis.

16. An optical system according to claim 9 wherein each of the first and second reflecting sub-systems have an outer edge which is symmetric with respect to said axis, so that the optical sub-systems together provide an inherent aperture and field which is larger in a direction transverse to the direction in which the optical path is folded.

17. A binocular instrument comprising a pair of optical systems arranged side by side, each optical system constructed about a viewing axis, each viewing axis being parallel to the other, each optical system comprising:

an objective lens for receiving input light propagating in a predetermined direction;

a first mirror for reflecting the input light to generate reflected light;

a second mirror for reflecting the reflected light to generate twice reflected light, the twice reflected light having traversed said axis at least once and propagating in a direction roughly parallel to the predetermined direction; and an eyepiece lens for receiving the twice reflected light and for focusing the twice reflected light;

wherein the objective lens, first and second mirrors and eyepiece lens are constructed to have defined centers of curvature, the centers of curvature of the first and second mirrors being displaced from said axis by distances less than 20% of their respective radii of curvature, and the centers of curvature of the objective lens and the eyepiece lens being displaced from said axis by distances less than twice the permitted displacement distances of the first and second mirrors, each of the first and second mirrors having an outer edge which is symmetric with respect to said axis to provide an inherent aperture and field which is larger in a direction transverse to the predetermined direction.

18. A binocular instrument comprising a pair of optical systems arranged side by side, each optical system constructed about a viewing axis, each viewing axis being parallel to the other, each optical system comprising:

an objective optical sub-system for receiving input light propagating in a first direction;

a first positive power reflective optical sub-system for reflecting for a first time the input light to generate reflected light;

a second positive power reflective optical sub-system for further reflecting the reflected light to generate twice reflected light propagating in a second direction; and an eyepiece optical sub-system for receiving and substantially collimating the twice reflected light;

wherein the input light, reflected light and twice reflected light travel along an optical path which is folded by the first and second positive reflective optical sub-systems so that the light traverses said axis at least once and said second direction is at least approximately parallel to said first direction, and each of the objective optical sub system, first and second reflecting sub-systems and eyepiece optical sub-system have defined effective centers of curvature, the effective centers of curvature of the first and second reflecting sub-systems being displaced from said axis by distances less than 20% of their respective effective radii of curvature, and the effective centers of curvature of the objective optical sub-system and the eyepiece optical sub-system being displaced from said axis by distances less than twice the permitted displacement distances of the first and second reflecting sub-systems.

19. A binocular instrument according to claim 17 or 18 wherein the side by side separation is a fixed distance.

20. A binocular instrument according to claim 17 or 18 wherein at least one of the optical systems further comprises a periscope sighting means coupled to the optical system to receive said twice reflected light.

21. A binocular instrument according to claim 17 or 18 and further comprising adjusting means for adjusting at least one of the optical systems to permit focusing on near or distant objects.

22. A binocular instrument according to claim 17 wherein each of the first mirrors have an inner edge which lies substantially in a common plane containing both of said axes.

23. A binocular instrument according to claim 22 wherein each of the second mirrors have an inner edge which lies substantially in a common plane containing both of said axes and the inner edges of the first mirrors.

24. A binocular instrument according to claim 17 wherein at least one surface of at least one of said lenses and mirrors of each of the optical systems is aspherical.

25. A binocular according to claim 18 wherein the light in each optical system twice traverses a plane containing both the viewing axes between the objective sub-system and the eyepiece sub-system.

26. A binocular instrument according to claim 18 wherein each of the first and second reflecting sub-systems of each optical system have an outer edge which is symmetric with respect to said axis, so that the optical sub-systems together provide an inherent aperture and field which is larger in a direction transverse to the direction in which the optical path is folded.

27. A binocular instrument according to claim 18 wherein at least one surface of at least one of said optical sub-systems of each of the optical systems is aspherical.

* * * * *